(12) United States Patent
Takata et al.

(10) Patent No.: US 6,559,954 B2
(45) Date of Patent: May 6, 2003

(54) METHOD AND DEVICE FOR MEASURING THE SHAPE OF A THREE DIMENSIONAL OBJECT

(75) Inventors: Yuji Takata, Fukuoka (JP); Hideaki Matsuo, Fukuoka (JP); Kazuyuki Imagawa, Fukuoka (JP); Takeshi Ohashi, Fukuoka (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 234 days.

(21) Appl. No.: 09/727,962

(22) Filed: Dec. 1, 2000

(65) Prior Publication Data
US 2001/0002695 A1 Jun. 7, 2001

(30) Foreign Application Priority Data
Dec. 1, 1999 (JP) ............................................. 11-342026

(51) Int. Cl.⁷ ........................ G01B 11/24; G01B 11/30; G06K 9/00
(52) U.S. Cl. .................... 356/604; 356/603; 382/154
(58) Field of Search ............................... 356/604, 603; 382/154

(56) References Cited

U.S. PATENT DOCUMENTS

| | | | | |
|---|---|---|---|---|
| 4,842,411 A | * | 6/1989 | Wood | 356/603 |
| 4,952,149 A | * | 8/1990 | Duret et al. | 356/604 |
| 5,450,204 A | * | 9/1995 | Shigeyama et al. | 356/604 |
| 5,646,733 A | * | 7/1997 | Bieman | 356/604 |
| 6,369,899 B1 | * | 4/2002 | Hamada | 356/603 |

FOREIGN PATENT DOCUMENTS

| | | |
|---|---|---|
| JP | 2300608 | 12/1990 |
| JP | 09293657 | 11/1997 |

* cited by examiner

Primary Examiner—Ricky Mack
Assistant Examiner—Alicia Harrington
(74) Attorney, Agent, or Firm—Darby & Darby (57) ABSTRACT

A 3D shape measurement method and a device using the method eliminate harmful influences of periodic inconstancy in the phase shift method. Optical intensity patterns following periodic functions of sine waves are irradiated on an object while shifting the phases thereof. Based on the image picked up from the object, the 3D shape of the object is measured. In this method, a plurality of optical intensity patterns following periodic functions with varying wavelengths are projected onto the object so as not to interfere with each other. The least common multiple of the wavelengths of the periodic functions is larger than the extent having periodic inconstancy within the image pickup area.

10 Claims, 8 Drawing Sheets

| L[1] | L[1] | L[1] | L. C. M. |
|---|---|---|---|
| 2 | 4 | 6 | 12 |
| 2 | 4 | 5 | 20 |
| 2 | 3 | 5 | 30 |
| 2 | 5 | 8 | 40 |
| 2 | 4 | 13 | 52 |
| 2 | 10 | 12 | 60 |
| 2 | 5 | 7 | 70 |
| 2 | 7 | 12 | 84 |
| 5 | 6 | 9 | 90 |
| 2 | 8 | 13 | 104 |

PRIOR ART

METHOD AND DEVICE FOR MEASURING THE SHAPE OF A THREE DIMENSIONAL OBJECT

BACKGROUND OF THE INVENTION

1. Field of the Invention

The present invention relates to a 3D shape measurement method and a device using the same, whereby the 3D shape of an object is measured by a phase shift method.

2. Description of Related Art

Sometimes measurement of the 3D shape of an object is necessary in various fields. As a measurement method in such a case, there is a laser beam scanning method, however, in this method, a great deal of laser irradiation and image photography are necessary in proportion to the resolution. This method therefore has long measurement times.

Therefore, as a method by which a 3D shape is measured at a high speed with high accuracy, the phase shift method has come to be noticed. In this method, an optical intensity pattern (typically, a sine wave-shaped pattern) following a periodic function is projected in time series while changing the phase. An image of the object is picked-up and used to determine the 3D shape of the object.

Among (X, Y, Z) of the 3D shape of the object, the plane coordinates of X and Y are easily determined from the picked-up image (projection plane). However, the Z coordinate (that is, depth) is not easily determined.

Figure 8:
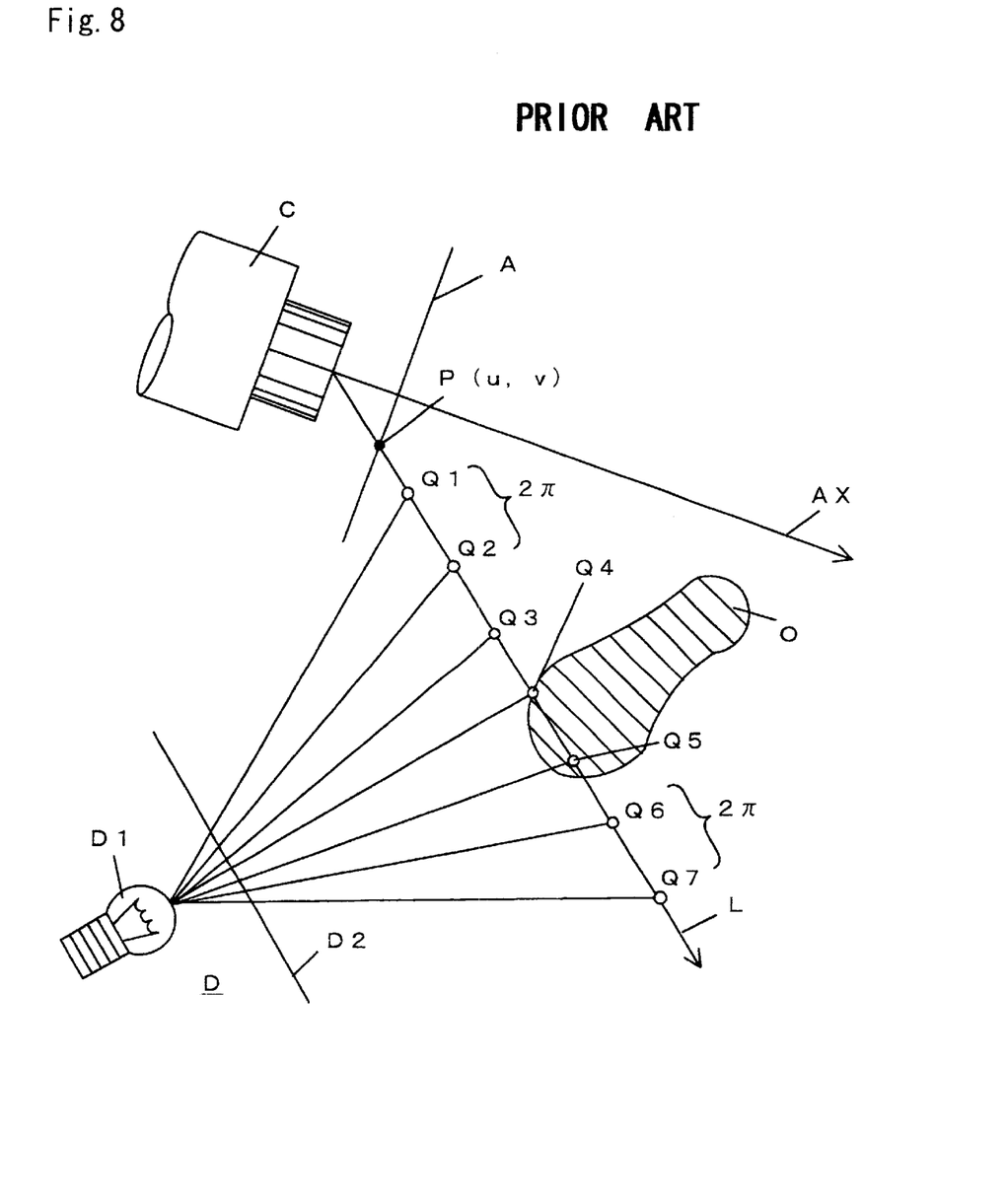
FIG. 8 is a schematic view of the prior-art 3D measurement.

Referring to the prior art technique in FIG. 8, the phase value φ is determined. Then, since the positional relationship between the image pickup means such as a camera and the projection means such as a projector is known, based on the principle of triangulation, the Z coordinate is determined from the phase value φ. In other words, if only the phase value φ is uniformly determined, the Z coordinate is also uniformly determined, whereby the 3D shape of the object is specified.

However, in the prior-art method, for the reasons mentioned below, the phase value φ has inconstancy (referred to as "periodic inconstancy" in this specification) of integral multiples of the period (2π in the case of sine waves). As a result, the phase value φ, and consequently the value of the Z coordinate, cannot be uniformly determined.

As shown in FIG. 8, the projection means D is equipped with a light source D1 and a display means D2 such as a liquid crystal panel. An optical intensity pattern in accordance with the abovementioned conditions are applied to the display means D2. Light from the light source D1 is transmitted through the display means D2 and projected toward an object O. A camera C, used as an image pickup means, has a projection plane A and an optical axis AX perpendicularly penetrating the center of this projection plane A.

Now, a certain measurement point on the object O is positioned at the point P (u, v) on the projection plane A. The XY coordinates of the measurement point is easily determined from the transverse coordinates (u, v). When considering the Z, or depth, coordinate, it is clearly understood that the measurement point may be located at any position along the line of sight L passing through the point P (u, v). In other words, it is said that the Z coordinate on the line of sight L is one of a group of calculated solutions of the Z coordinate (the number of solutions is infinite).

On supposition that the number of repetitions of image pickup is N. When employing sine waves as a periodic function, the phase to be shifted per repetition is $2\pi/N$ (n=0, 1, 2, . . . , N−1). The image pickup time tn is defined to be $2\pi n/N$.

At this time, if the luminance at the coordinates (u, v) in the camera image is defined as In (u, v), in order to prevent the value of luminance of the pattern from becoming negative, the luminance bias (texture image) Ibias is set according to the following formula.

$$I_{bias} = \sum_{n=0}^{N-1} I_n(u, v) \qquad \text{(Formula 1)}$$

The phase value φ (u, v) to be determined is expressed by the following formula.

$$\phi(u, v) = -\frac{\sum_{n=0}^{N-1} \frac{2\pi}{N} I_n(u, v) \sin tn}{\sum_{n=0}^{N-1} \frac{2\pi}{N} I_n(u, v) \cos tn} \qquad \text{(Formula 2)}$$

As is clearly understood from (Formula 2), the phase value φ (u, v) has a range from −π to π. Furthermore, even if φ+2πm (m is an integer) is substituted for φ, the Formulas stand up in the same way. That is, the phase value φ has periodic inconstancy of 2 π per period. In addition, even when a different periodic function is used, the periodic inconstancy is inevitable as long as the function is a periodic function.

The result, as shown in FIG. 8, is that the group of infinite solutions of the calculated Z coordinate on the line of sight L is reduced to the group of a finite number of solutions (in the illustrated example, Z coordinates at the points Q1 through Q7). However, which solution is the true Z coordinate at the noticed point cannot be determined from this group.

Herein, the number of solutions in the group (7 in the example of FIG. 8) is the number of stripes in the optical intensity pattern, and the number of stripes is in inverse proportion to the wavelength of the periodic function. One possibility to avoid the abovementioned inconstancy is to increase the wavelength of the periodic function by reducing the number of stripes (typically, reduce the number to 1). However, in such a method, measurement accuracy is degraded, so that the method is not practicable.

OBJECTS AND SUMMARY OF THE INVENTION

The invention is made in view of the above circumstances, and the object thereof is to provide a 3D shape measurement method and a device using the same, whereby harmful influences of the periodic inconstancy is eliminated while maintaining measurement accuracy.

In the invention, a plurality of optical intensity patterns following periodic functions with varying wavelengths are projected onto an object so as not to interfere with each other. The least common multiple of the wavelengths of the periodic functions is larger than the extent having periodic inconstancy within a prescribed area.

By this construction, the wavelengths are made sufficiently short, and measurement accuracy is maintained. At the same time, even if each wavelength is short, the least common multiple is larger than the extent having the periodic inconstancy, so that the next periodic inconstancy is outside the prescribed area.

According to the invention, harmful influences of periodic inconstancy, which is inevitable in 3D measurement using the phase shift method, is eliminated, so that a highly-reliable measurement at a high speed is achieved. The foregoing and other features and advantages of the present invention will become more readily more appreciated as the same is better understood by reference to the following detailed description when taken into conjunction with the accompanying drawings.

DETAILED DESCRIPTION OF THE PREFERRED EMBODIMENT

In a first aspect of the invention, optical intensity patterns following periodic functions are irradiated on an object while shifting the phases. Based on the result of image pickup from the object, the 3D shape of the object is measured, wherein the plurality of optical intensity patterns following periodic functions with varying wavelengths are projected onto the object so as to not interfere with each other. The least common multiple of the wavelengths of the periodic functions is larger than the extent having periodic inconstancy within a prescribed area.

In a second aspect of the invention, the method comprises steps of determining the minimum synthetic wavelength based on the size of the prescribed area; determining a combination of wavelengths for the plurality of optical intensity patterns so that the least common multiple of the wavelengths is greater than the determined minimum synthetic wavelength; obtaining a result of image pickup by projecting the determined plurality of optical intensity patterns onto an object while shifting the phases so as to not interfere with each other; and measuring the 3D shape of the object based on the result of image pickup.

Thus, since the least common multiple of the wavelengths is larger than the extent having periodic inconstancy within the prescribed area, the periodic inconstancy is excluded from this prescribed area, whereby the phase value is uniformly determined, and the harmful influence of the periodic inconstancy is eliminated.

At the same time, since the least common multiple of the wavelengths only is required to satisfy the above condition, the wavelengths are sufficiently small to avoid a decline in the measurement accuracy.

In a third aspect of the invention, the prescribed area is the maximum image pickup area.

By this construction, the non occurrence of periodic inconstancy is guaranteed regardless of any image of an object that is picked-up. Therefore, the processing and processing time for instructing the prescribed area for each object is omitted.

In a fourth aspect of the invention, the prescribed area is an area surrounding the object.

By this construction, the prescribed area is made generally smaller than the maximum image pickup area and limited to only an important area. That is, the wavelengths are smaller, and the number of stripes of the optical intensity patterns is selected to be more, and the measurement accuracy is improved. Incidentally, if so, in an area within the maximum image pickup area which deviates from the prescribed area, periodic inconstancy may occur, however, this does not relate to measurement of the shape, so that this is not harmful in actuality.

In a fifth aspect of the invention, the wavelengths of the plurality of intensity patterns are relatively prime.

By this construction, even if the wavelengths are small, the least common multiple of the wavelengths is the product of all wavelengths and is relatively large, so that good efficiency is obtained. That is, the measurement accuracy is improved even in the case of the small wavelengths, and the extent without periodic inconstancy is widened.

In a sixth aspect of the invention, a plurality of colors which are color separated later are selected, and a plurality of optical intensity patterns of the selected plurality of colors are projected onto an object at the same time, and then color separated.

By this construction, projection and image pickup by means of the wavelengths is collectively carried out, so that measurement time is shortened.

In a seventh aspect of the invention, the plurality of colors are three, that is, red, green, and blue.

By this construction, RGB signals, which have been generally used in image equipment, may be handled, and existing devices installed, whereby easy measurement at a low cost is achieved.

The device of an eighth aspect of the invention comprises an image pickup area instruction means for instructing an image pickup area, an optical intensity pattern generation means for generating a plurality of optical intensity patterns following periodic functions with varying wavelengths based on the size of this image pickup area, a signal generation means for generating a plurality of image signals resulting from shifting the phases of the optical intensity patterns so as not to interfere with each other, a projection means for projecting the optical intensity patterns onto an object based on the plurality of image signals, an image pickup means for picking-up the image of the object, a color separation means for color separating the result of image pickup to take-out the plurality of image signals, a phase value calculation means for calculating a plurality of phase values from the taken-out plurality of image signals, and a measurement result generation means for generating the result of 3D shape measurement by determining the Z coordinate upon determining a true phase value from the calculated plurality of phase values and by determining the XY coordinates from the coordinates of the projection plane.

By this construction, the harmful influence of periodic inconstancy is eliminated by using the optical intensity patterns with a plurality of wavelengths.

In the device of a ninth aspect of the invention, the image pickup means is a single camera, and the projection means is a single color projector.

In this field, there are many complicated examples of constructions using a plurality of cameras, however, if the abovementioned construction is employed, measurement is carried out by an extremely simple construction, and the measuring device is compact as well as lower in cost.

Figure 1:
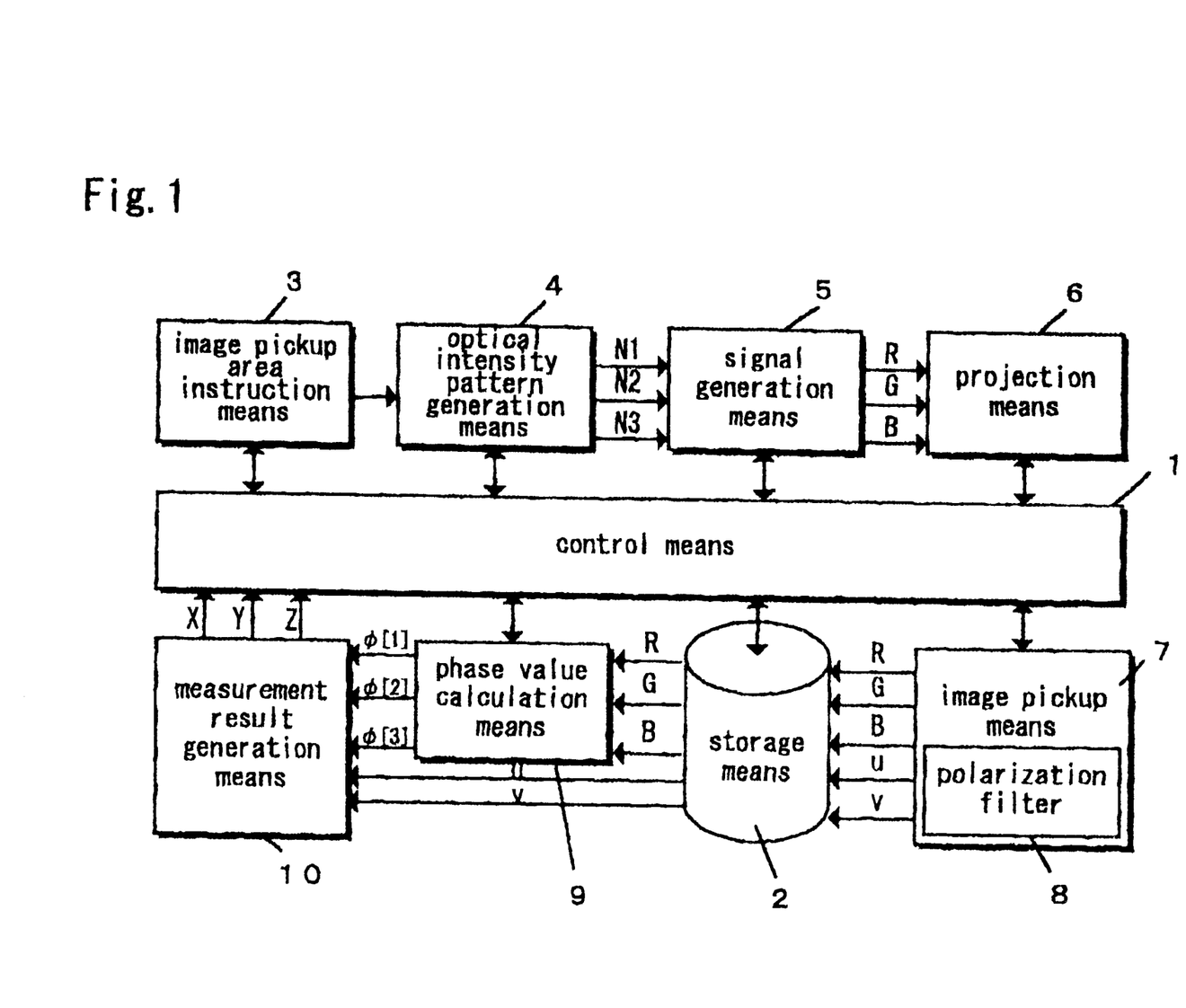
FIG. 1 is a block diagram of the 3D shape measuring device according to an embodiment of the invention.

Next, an embodiment of the invention shall be described with reference to the drawings. FIG. 1 is a block diagram of the 3D shape measuring device of an embodiment of the invention.

As shown in FIG. 1, this 3D shape measuring device includes a control means 1 which controls other illustrated components. A storage means 2 stores information on results of image pickup, information necessary for processing of the control means 1, and a control program which is operated on the control means 1. The storage means 2 includes, for example, a memory and a hard disk device. Other types of memory devices may be employed without departing from the spirit and scope of the invention.

An image pickup area instruction means 3 instructs a prescribed area. Image pickup area instruction means 3 is made up, for example, of a LCD or CRT, a keyboard, a hardware user interface such as a pointing device, and processing processes for controlling the user interface at low-order and high-order levels. This prescribed area is selected from either the maximum image pickup area of the image pickup plane A shown in FIG. 2 or the area surrounding the object. Herein, the maximum image pickup area is already known from the hardware specifications of the image pickup plane A, so that the image pickup area instruction means 3 may be omitted if the maximum image pickup area is always set as the prescribed area. In addition, the area surrounding the object is automatically set by means of generally-known image processing. Alternately, the area surrounding the object may be manually set by an operator.

In any case, this prescribed area is normally rectangular. In this rectangular shape, the length of the side in the direction of phase advance of the optical intensity patterns (the vertical direction in the case where the stripes are horizontally long and the phase moves vertically, and the horizontal direction in the case where the stripes are vertically long and the phase moves horizontally) is important. This length, or a length slightly longer than this length, is defined as a minimum synthetic wavelength Lm_MIN.

An optical intensity pattern generation means 4 generates a plurality of optical intensity patterns following periodic functions with varying wavelengths based on the minimum synthetic wavelength Lm_MIN. In the present embodiment, $f(tn)=A\sin(tn)$ $(tn=2\pi n/N; n=0,1,2, \ldots, N-1)$ is employed for periodic functions, and the luminance bias mentioned above (Formula 1) is used.

Other periodic functions, such as sawtooth waves and trapezoidal waves, may be substituted for the sine functions.

Any number of optical intensity patterns of 2 or more is effective. In the present embodiment, the number of optical intensity patterns is set to 3. The wavelengths of the three optical intensity patterns are L[1], L[2], and L[3].

A signal generation means 5 generates a plurality of image signals resulting from shifting the phases of the optical intensity patterns so as not to interfere with each other. In the present embodiment, the plurality of image signals is chosen as the three colors, R (red), G (green), and B (blue). The optical intensity pattern of the wavelength L[1] is inputted to the R signal, the optical intensity pattern of the wavelength L[2] is inputted to the G signal, and the optical intensity pattern of the wavelength L[3] is inputted to the B signal.

Thus, the use of the RGB signals makes diversion of the existing image devices easier, and this is advantageous.

However, other combinations of colors may be used. When another combination of colors is used, they can be converted into the RGB signals, and then inverse-converted to return to the original combination of colors. In any case, it is desirable that all signals have luminance.

Figure 2:
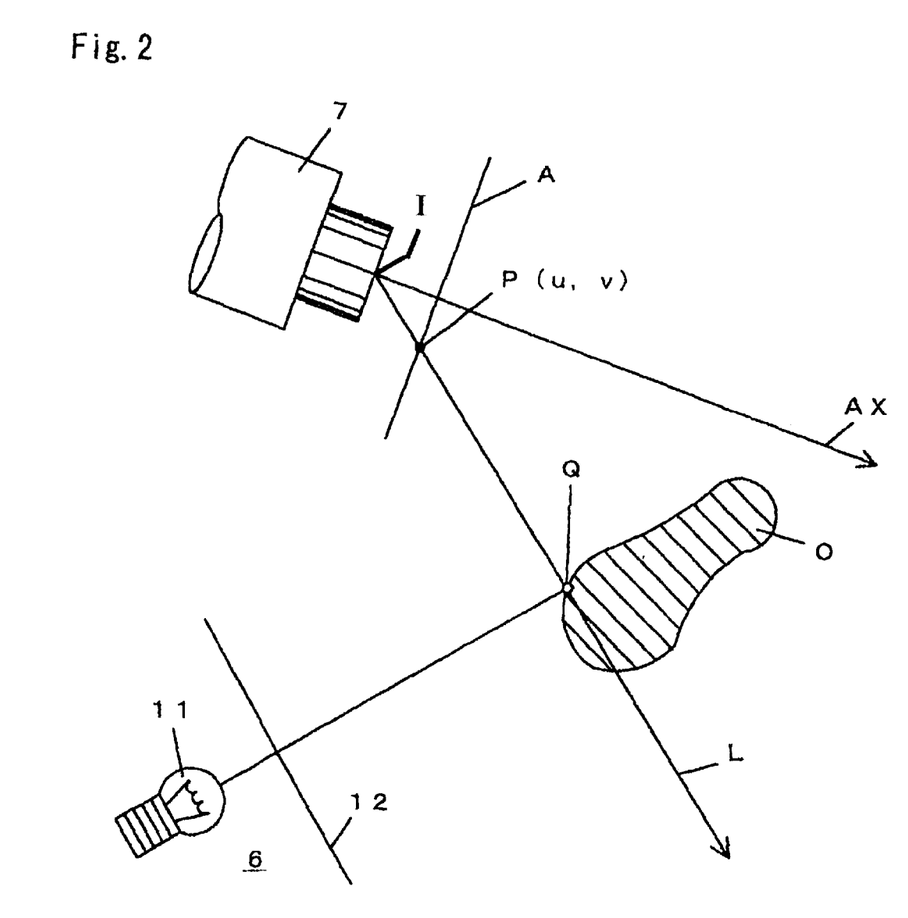
FIG. 2 is a schematic view of the same 3D measurement.

Referring now also to FIG. 2, a projection means 6 collectively projects the abovementioned three optical intensity patterns onto an object O. Projection means 6 is symbolically represented by a light source 11 and a display means 12, based on the image signals (RGB signals in the present embodiment) outputted from the signal generation means 5.

When projection (image pickup) at several optical wavelengths is carried out at the same time, the measurement time is shortened. This is, of course, advantageous. If the time for measurement is not critical, and if object O remains stationary, the patterns of the colors may be projected one by one. In this case, optical intensity patterns of white and black, that is, optical intensity patterns that only have luminance may be used.

Image pickup means 7 is comprised of a 3CCD video camera, which picks-up the image of the object O. In the present embodiment, the image pickup means 7 has color separation filter 8 installed inside for separating the incoming light into the three colors of RGB. The color separation filter 8 is separate from the image pickup means 7, and the color separation is optically carried out. Color separation could also be carried out by means of image processing.

In the present embodiment, the image pickup means 7 outputs the RGB values of the pixels (coordinates (u, v)) to the storage means 2, which stores them.

A phase value calculation means 9 calculates a plurality of phase values from the RGB image signals. In the present embodiment, the phase value φ [1], relating to the wavelength L[1], is calculated from the R signal, the phase value φ [2], relating to the wavelength L[2], is calculated from the G signal, and the phase value φ [3], relating to the wavelength L[3], is calculated from the B signal. For these calculations, the abovementioned (Formula 2) is used.

Measurement result generation means 10 calculates the true phase value φ (u, v) from the phase values φ [1], φ [2], and φ [3] using the following formula.

$$\phi(u, v) = \frac{\phi[1](u, v) + \phi[2](u, v) + \phi[3](u, v)}{L[1]L[2] + L[2]L[3] + L[3]L[1]} \quad \text{(Formula 3)}$$

Thus, according to the invention, the phase value φ (u, v) is uniformly determined. That is, as shown in FIG. 2, the XYZ coordinates of one point Q on the line of sight L are obtained. It is necessary to compare this fact with the condition of FIG. 8 showing the prior-art method.

Next, phase value calculation means 9 calculates XYZ coordinates of the point Q by using the following formula. Herein, in FIG. 2, on a plane in parallel to the XY plane in the object centered coordinate system in which the object O exists, the center of the light source 11 and the point of sight I on the optical axis AX exist.

$$X = \frac{Kau}{c\phi(0,0)} \quad \text{(Formula 4)}$$

$$Y = \frac{Kav}{c\phi(0,0)}$$

$$Z = \frac{K(a-Y)}{\phi(u,v)} - \frac{Ka}{\phi(0,0)}$$

$$K = \frac{2\pi b}{L[1]L[2]L[3]}$$

a: distance between center of light sourse and point of sight b: distance between center of light sourse and display means c: focal distance of image pickup means By the abovementioned calculations, the 3D shape of the object O is uniformly measured.

Next, the flow of the entirety of measurement is described with reference to FIG. 3. First, when information on the prescribed area is inputted from the image pickup area instruction means 3, the optical intensity pattern generation means 4 determines a combination of the wavelengths L[1], L[2], and L[3] (step 1). Concretely, as shown in FIG. 4, the length of the abovementioned side of the instructed prescribed area is acquired (step 10). This length of the side is defined as the minimum synthetic wavelength Lm_MIN (step 11). Then, the optical intensity pattern generation means 4 calculates a combination of wavelengths L[1], L[2], and L[3] the least common multiple of which is more than the minimum synthetic wavelength Lm_MIN (steps 12, 13 and 14).

Figure 5:
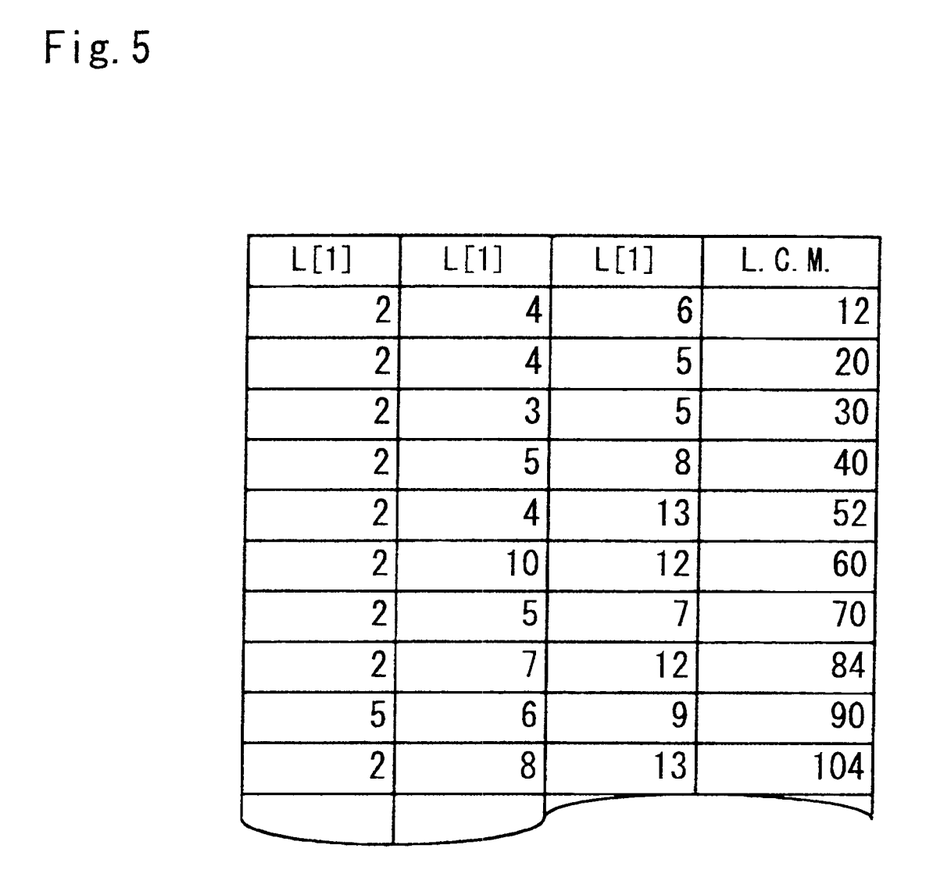
FIG. 5 is an illustration of a wavelength combination table of the 3D measurement.

In the present embodiment, the optical intensity pattern generation means 4 has the table shown in FIG. 5. If, for example, "27" is given as the abovementioned length of the side, then Lm_MIN=27. A combination of wavelengths, the least common multiple of which is larger than 27, is searched for. At this time, a combination (L[1]=2, L[2]=3, L[3]=5) is selected the least common multiple of which is 30. For this selection, the fact that shorter wavelengths are advantageous in terms of the measurement accuracy is considered.

Herein, the combination of 2, 3, and 5 is ideal since these numbers are relatively prime, the wavelengths are small, and the least common multiple is large. Even if such a table is not used, a combination of wavelengths satisfying the conditions is obtained by means of a simple algorithm.

Figure 3:
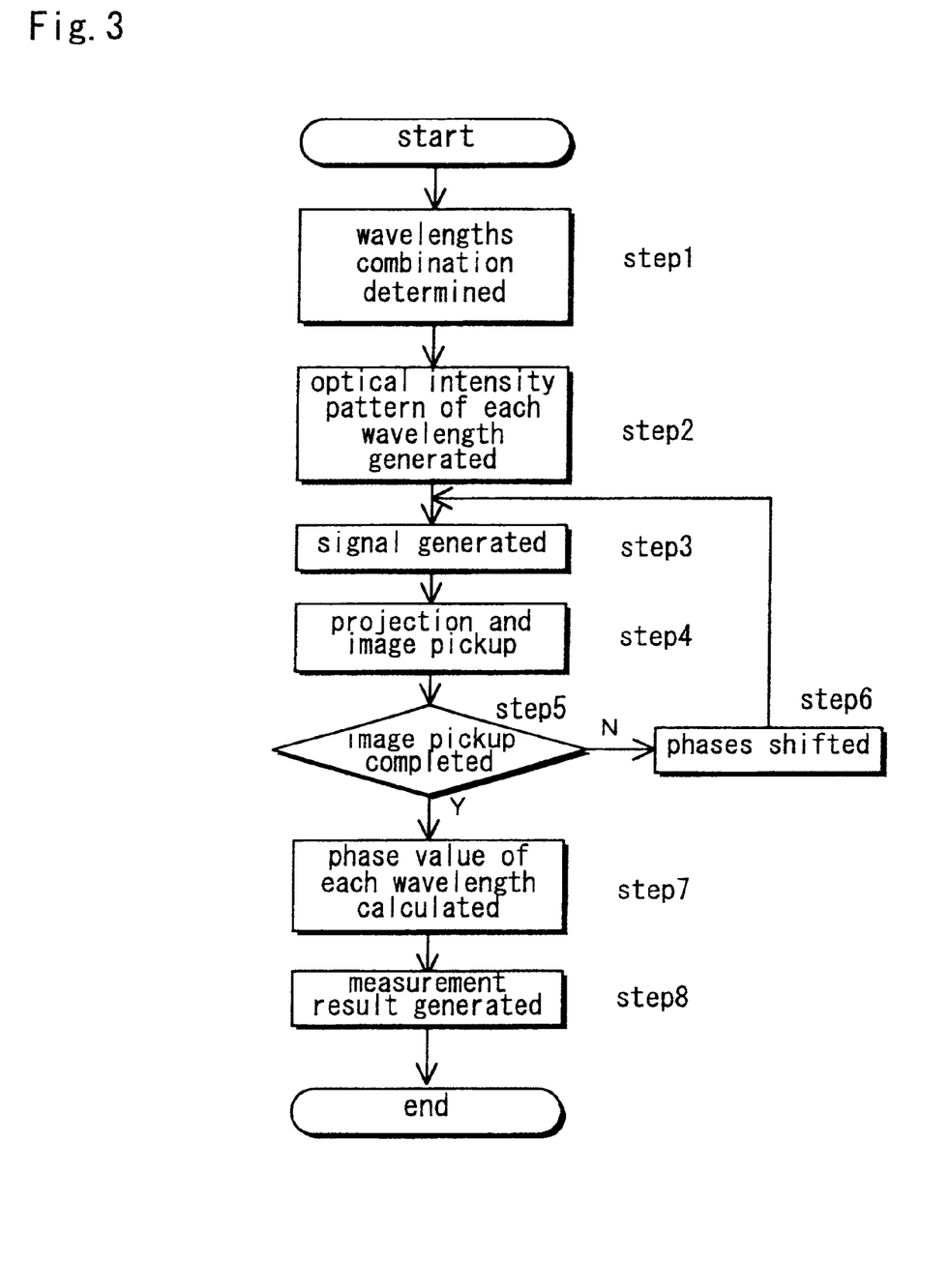
FIG. 3 is a flow chart showing the processes of the 3D measurement.
Figure 4:
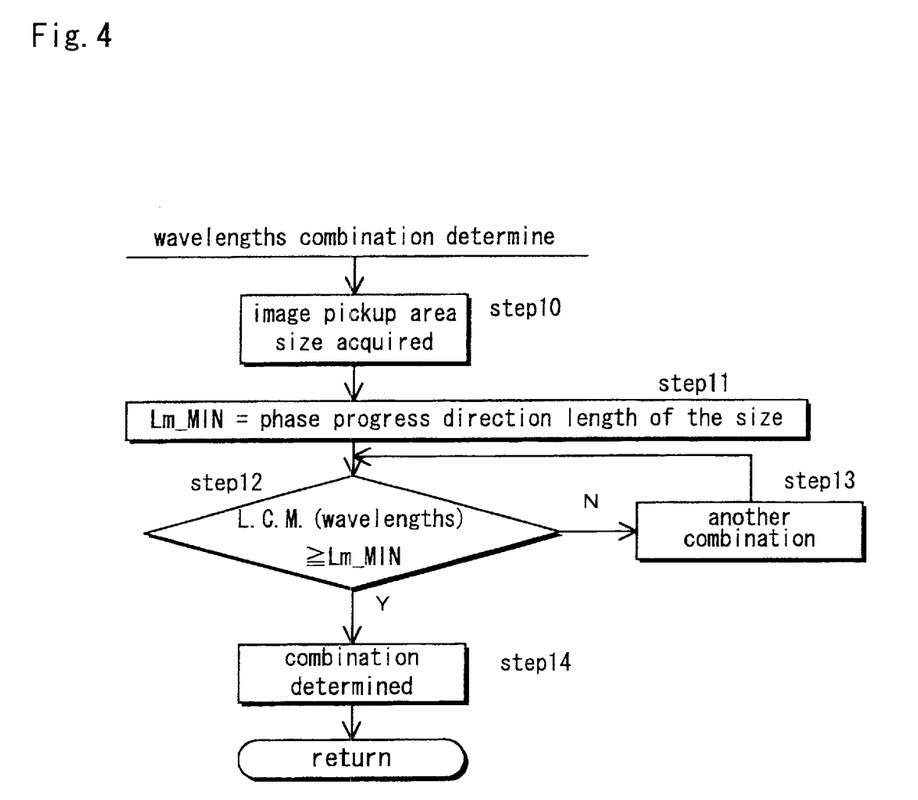
FIG. 4 is a flow chart showing the processes of determination of a wavelength combination of the 3D measurement.

Next, in step 2 of FIG. 3, based on the combination of L[1]=2, L[2]=3, and L[3]=5, the optical intensity pattern generation means 4 generates the optical intensity pattern N1 with a wavelength of 2 for the R signal, the optical intensity pattern N2 with a wavelength of 3 for the G signal, and the optical intensity pattern N3 with a wavelength of 5 for the B signal, and outputs these patterns to the signal generation means 5.

Next, in step 3, the signal generation means 5 generates the RGB signals based on these patterns N1, N2, and N3 (without phase shift), and outputs them to the projection means 6.

Then, the projection means 6 projects the patterns onto the object O. The image pickup means 7 picks-up the image of the object O (step 4). At this time, the color separation filter 8 color separates the patterns into the RGB signals, and the storage means 2 stores the coordinates (u, v) and RGB signals.

The processing of steps 3 and 4 is repeated (N times) until projection and image pickup are completed while shifting the phases by $2\pi/N$ (steps 5 and 6).

When necessary data is accumulated in the storage means 2, the phase value calculation means 9 calculates phase values φ [1], φ [2], and φ [3] from the RGB signals, and outputs them to the measurement result generation means 10. The measurement result generation means 10 determines a true phase value φ (u, v) from the inputted phase values φ [1], φ [2], and φ [3] and coordinates (u, v), and furthermore, calculates a result of 3D measurement (X, Y, Z), and outputs it to the control means 1.

Figure 6:
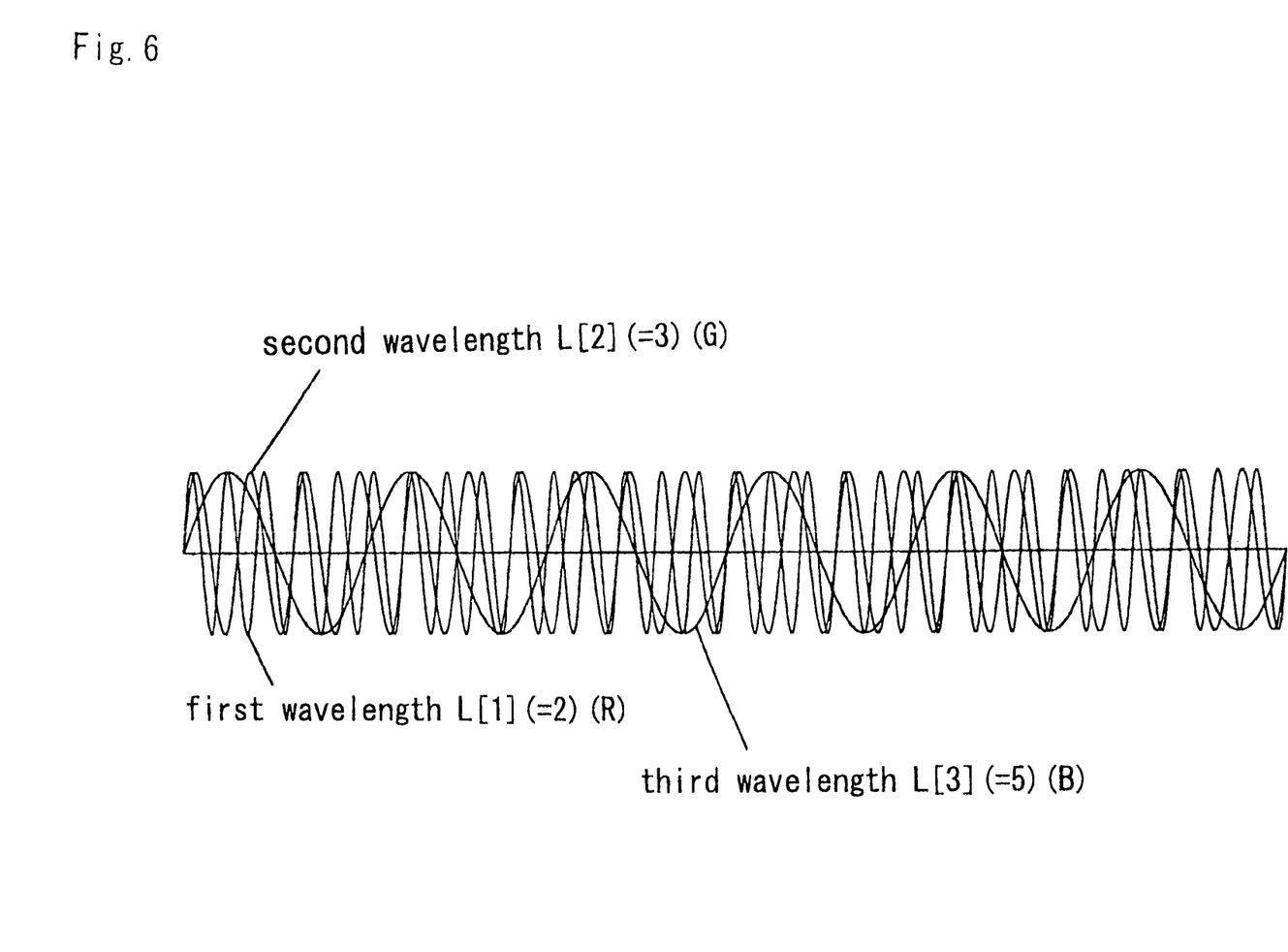
FIG. 6 is a graph showing the periodic functions of the combination of the 3D measurement.
Figure 7:
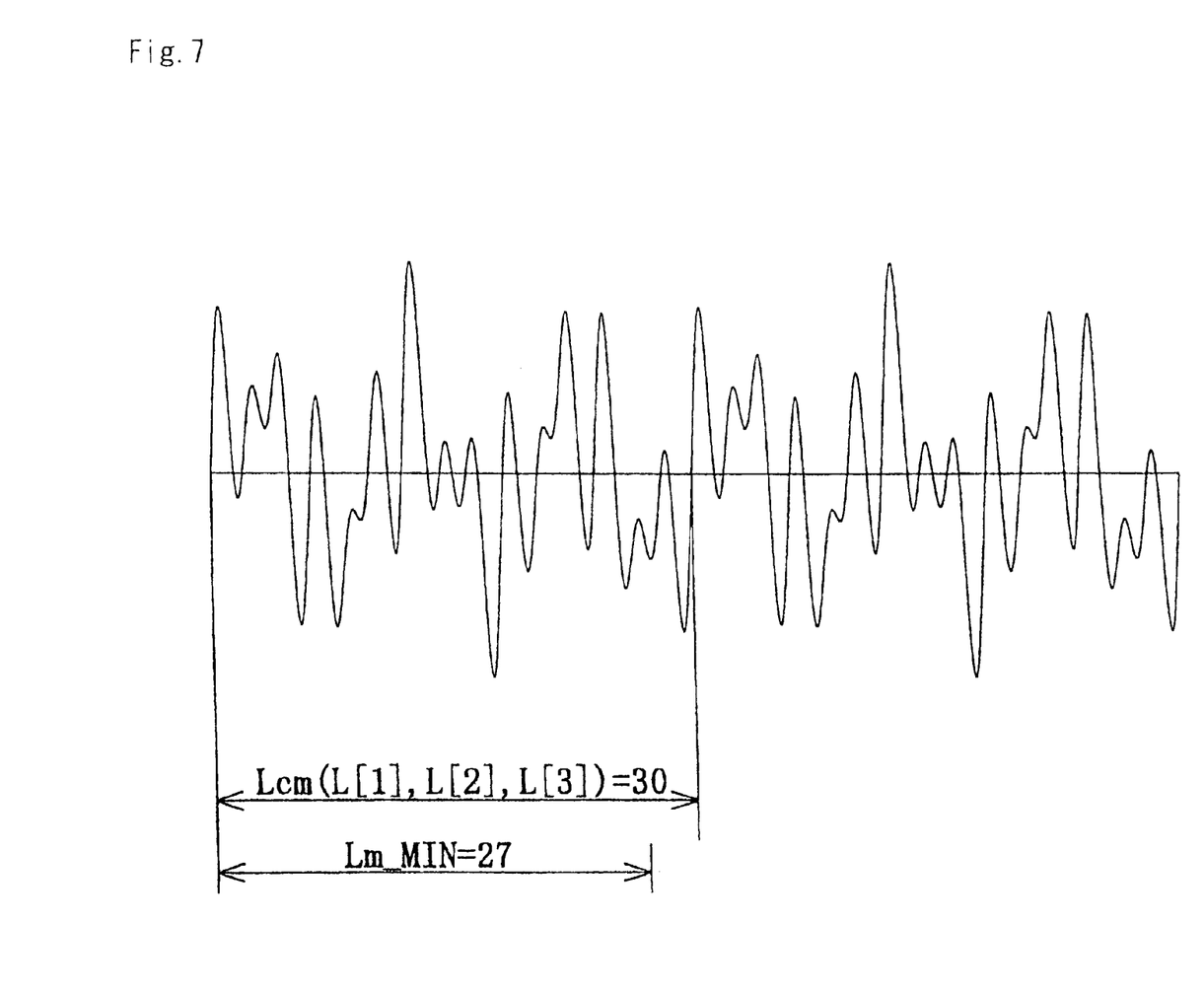
FIG. 7 is a graph showing the relationship between the minimum synthetic wavelength and the least common multiple of the wavelengths of the 3D measurement.

Herein, the sine waves of the combination of wavelengths of 2, 3, and 5 are illustrated as shown in FIG. 6. The R signal is the first wavelength L[1]=2, the G signal is the second wavelength L[2]=3, and the B signal is the third wavelength L[3]=5. Incidentally, if these waveforms are synthesized, the synthesized waveform is as shown in FIG. 7. That is, the wavelength of a synthesized function is the least common multiple 30 of the wavelengths (2, 3, and 5). However, the waveform itself of FIG. 7 does not have any particular meaning. By setting the least common multiple to be more than the abovementioned minimum synthetic wavelength Lm_MIN (=27), periodic inconstancy within the prescribed area is excluded.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A 3D shape measurement method comprising:

irradiating an object with a plurality of optical intensity patterns;

varying an intensity pattern of said optical intensity patterns according to periodic functions;

said periodic functions having varying wavelength;

shifting phases of said periodic functions;

said plurality of optical intensity patterns having varying wavelengths so that said optical intensity patterns do not interfere with each other;

a least common multiple of wavelengths of said periodic functions is larger than an extent having periodic inconstancy within a prescribed area; and measuring 3D shape of said object based on said image.

2. A 3D shape measurement method as set forth in claim 1, wherein said prescribed area is a maximum image pickup area.

3. A 3D shape measurement method comprising steps of:

determining a minimum synthetic wavelength from a size of a prescribed area;

determining a combination of wavelengths for a plurality of optical intensity patterns so that a least common multiple thereof is larger than a predetermined minimum synthetic wavelength;

projecting said determined plurality of optical intensity patterns onto a object while shifting said phases so that they do not interfere with each other;

picking up an image of said object with said optical intensity patterns; and measuring said 3D shape of said object based on said image.

4. A 3D shape measurement method as set forth in claim 3, wherein said prescribed area is a maximum image pickup area.

5. A 3D shape measurement method as set forth in claim 1, wherein said prescribed area is an area surrounding said object.

6. A 3D shape measurement method as set forth in claim 1, wherein wavelengths of said plurality of intensity patterns are relatively prime.

7. A 3D shape measurement method as set forth in claim 1, wherein:
   said plurality of optical intensity patterns are of different colors;
   said different colors are projected onto said object at the same time; and
   said different colors are color separated in said image.

8. A 3D shape measurement method as set forth in claim 7, wherein said plurality of colors are three colors, that is, red, green, and blue.

9. A 3D shape measuring device, comprising:
   an image pickup area instruction means for instructing an image pickup area;
   an optical intensity pattern generation means for generating a plurality of optical intensity patterns following periodic functions with varying wavelengths based on a size of said image pickup area;
   a signal generation means for generating a plurality of image signals, which result from shifting phases of said optical intensity patterns and do not interfere with each other;
   a projection means for projecting said optical intensity patterns onto an object based on said plurality of image signals;
   an image pickup means for picking-up an image of said object;
   a color separation means for color separating a result of image pickup to separate said plurality of image signals;
   a phase value calculation means for calculating a plurality of phase values from said separated plurality of image signals; and
   a measurement result generation means for generating a result of measurement of said 3D shape by finding Z coordinate upon determining a true phase value from a calculated plurality of phase values, and by finding XY coordinates from coordinates of a projection plane.

10. A 3D shape measuring device as set forth in claim 9, wherein said image pickup means is a single camera, and said projection means is a single color projector.

* * * * *